July 16, 1957 W. SCHMIDT 2,799,510
SALT SPREADER

Filed May 7, 1953 5 Sheets-Sheet 1

INVENTOR.
WILLIAM SCHMIDT
BY
Harry H. Hitzeman
ATTORNEY.

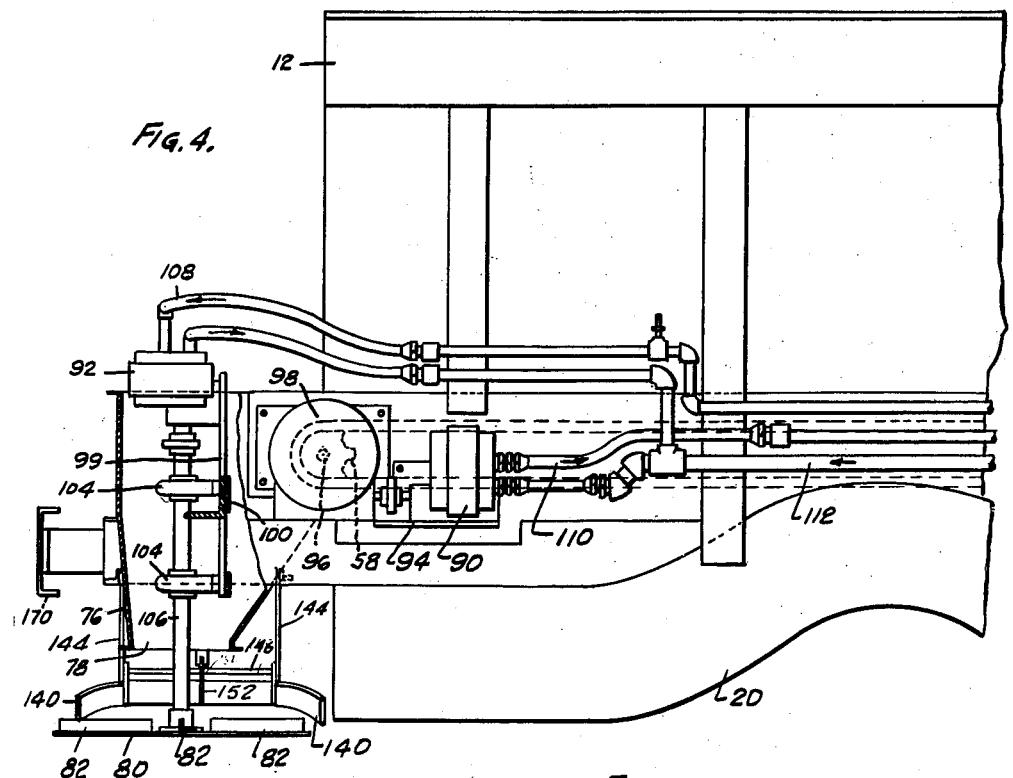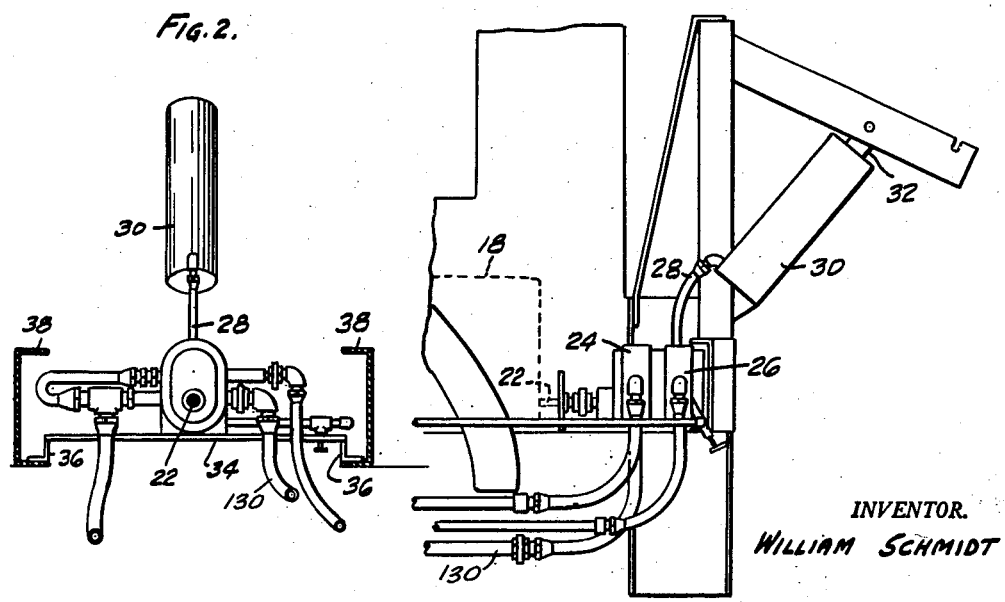

July 16, 1957

W. SCHMIDT 2,799,510

SALT SPREADER

Filed May 7, 1953

INVENTOR.
WILLIAM SCHMIDT
BY
Harry H. Hitzeman
ATTORNEY.

July 16, 1957  W. SCHMIDT  2,799,510
SALT SPREADER

Filed May 7, 1953  5 Sheets-Sheet 4

INVENTOR.
WILLIAM SCHMIDT
BY
Harry N. Hitzeman
ATTORNEY.

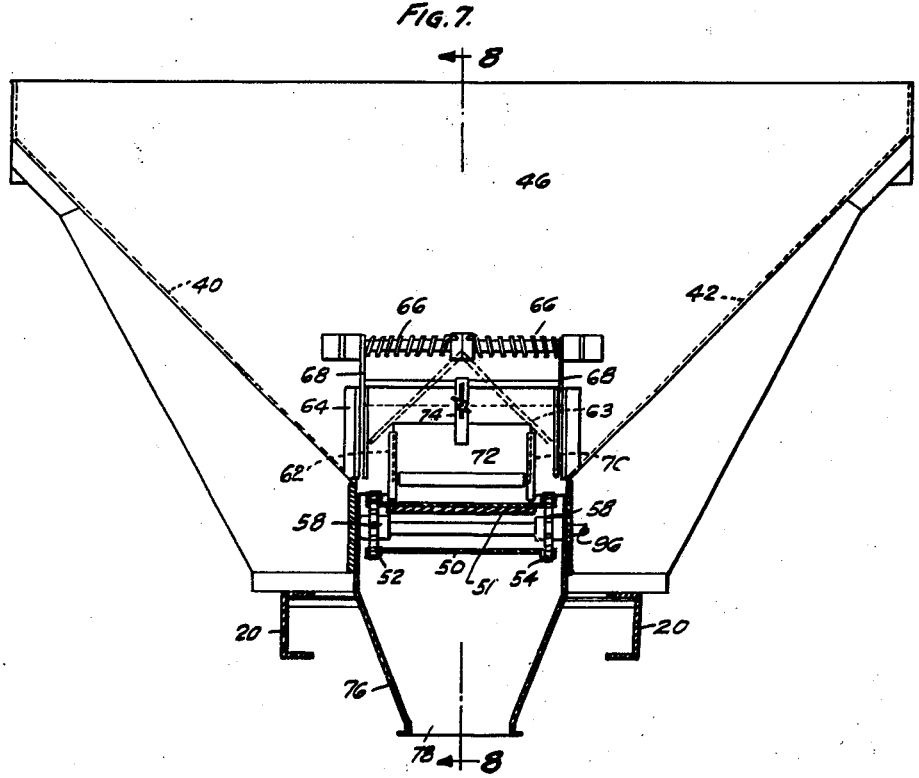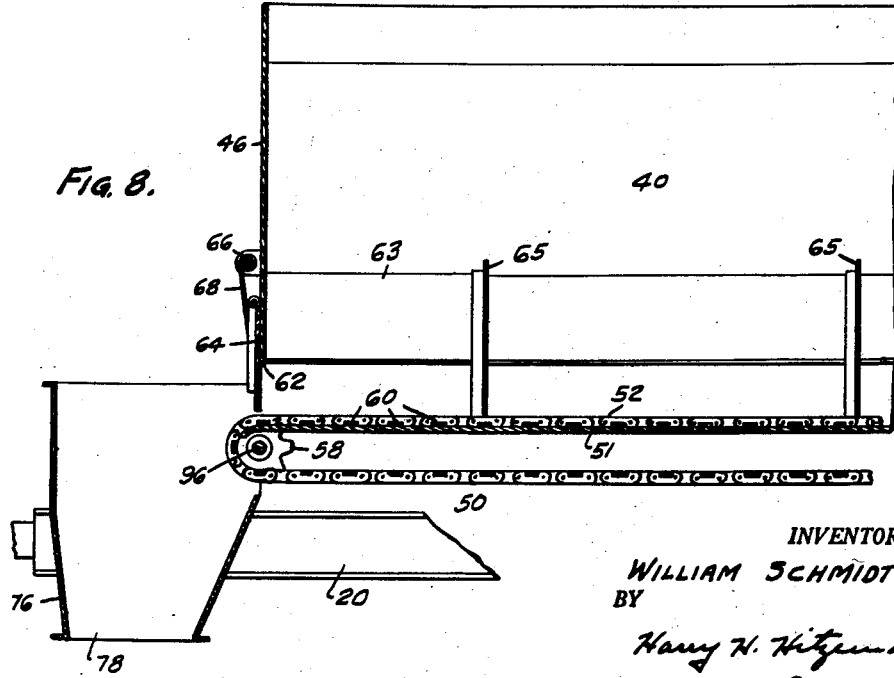

United States Patent Office 2,799,510
Patented July 16, 1957

2,799,510
SALT SPREADER
William Schmidt, Chicago, Ill.

Application May 7, 1953, Serial No. 353,608

1 Claim. (Cl. 275—8)

My invention relates to apparatus for distributing salt or sand.

My invention relates more particularly to apparatus of this type which includes a truck provided with a body for carrying a load of salt or sand and automatic means associated therewith for spreading or distributing a coating of salt or sand on icy pavements as the truck travels along the same.

The principal object of the present invention is to provide an improved salt or sand spreader.

A further object of the invention is to provide in combination with a power driven truck having a material carrying body, conveyor means in the truck body for carrying salt or other material to the back of the same and dropping it upon a revolving disc or spinner, the conveyor and spinner adapted to be driven from the power plant of the truck.

A further object of the invention is to provide apparatus of the type described which includes a hydraulic drive for both the conveyor in the truck body and the spinner or rotating disc at the end of the same, which spreads the material over a wide strip as the truck moves forward.

A further object of the invention is to provide in combination with the power plant of the material load carrying truck, a drive therefrom to a hydraulic pump mounted adjacent the power plant, the pump having a circuit which includes a fluid tank or reservoir and individual hydraulic motors for driving a material conveyor on the floor of the truck body and for rotating the spinner or rotatable disc below the hopper at the outlet end of the conveyor. The hydraulic pump may also be utilized to operate snow plow raising and lowering mechanism located at the forward end of the truck.

A further object of the invention is to provide deflector means associated with the spinner or spreader for regulating or controlling the width of the strip to be covered by the material being spread.

A further object of the invention is to provide individual deflector or control means on both sides of the spinner or spreader, whereby material may be spread on the right side only of the moving truck, on the left side only or over a strip which extends both right and left of the spinner.

A further object of the invention is to provide a yieldable spring mounted door at the end of the truck body for permitting egress of large lumps of salt or other material from the truck body without damaging any of the operating parts but normally controlling the rate of flow of material to the spinner or rotatable disc.

Other objects and advantages of the invention will be more apparent from the following description wherein reference is had to the accompanying drawings, upon which Fig. 1 is a side elevational view of one embodiment of the invention, a portion of the snow-plow mechanism at the front of the truck being broken off;

Fig. 2 is a fragmentary cross-sectional view at the forward end of the truck cab showing the hydraulic pumps, the piping leading from the same and the hydraulic cylinder for actuating the snow plow at the front of the truck;

Fig. 3 is a fragmentary side elevational view of the same parts;

Fig. 4 is an enlarged fragmentary view of the back end of the apparatus with parts broken in section to more clearly show other parts;

Fig. 7 is a cross-sectional view through the hopper adjacent the back wall of the truck body taken on the line 7—7 of Fig. 1;

Fig. 8 is a fragmentary vertical sectional view through the back end of the truck body and associated parts taken generally on the line 8—8 of Fig. 7.

Figure 1:
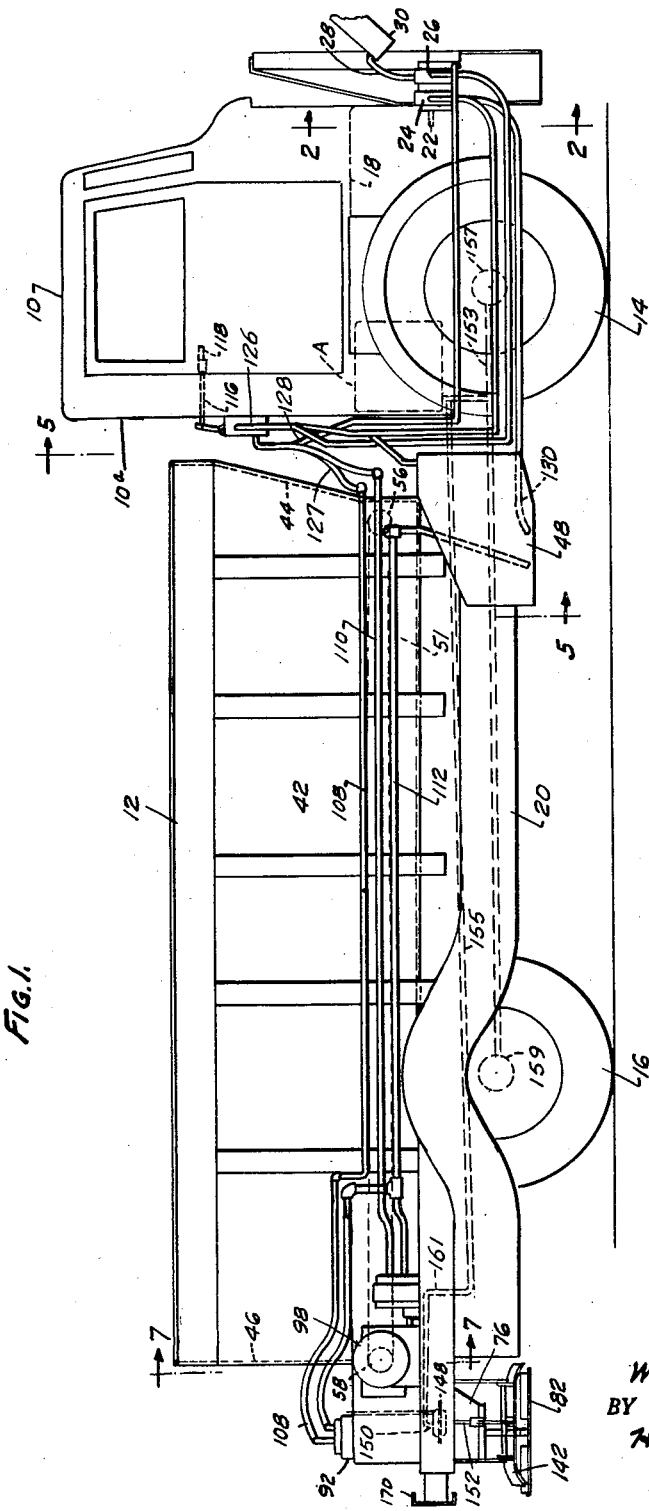
Figure 5:
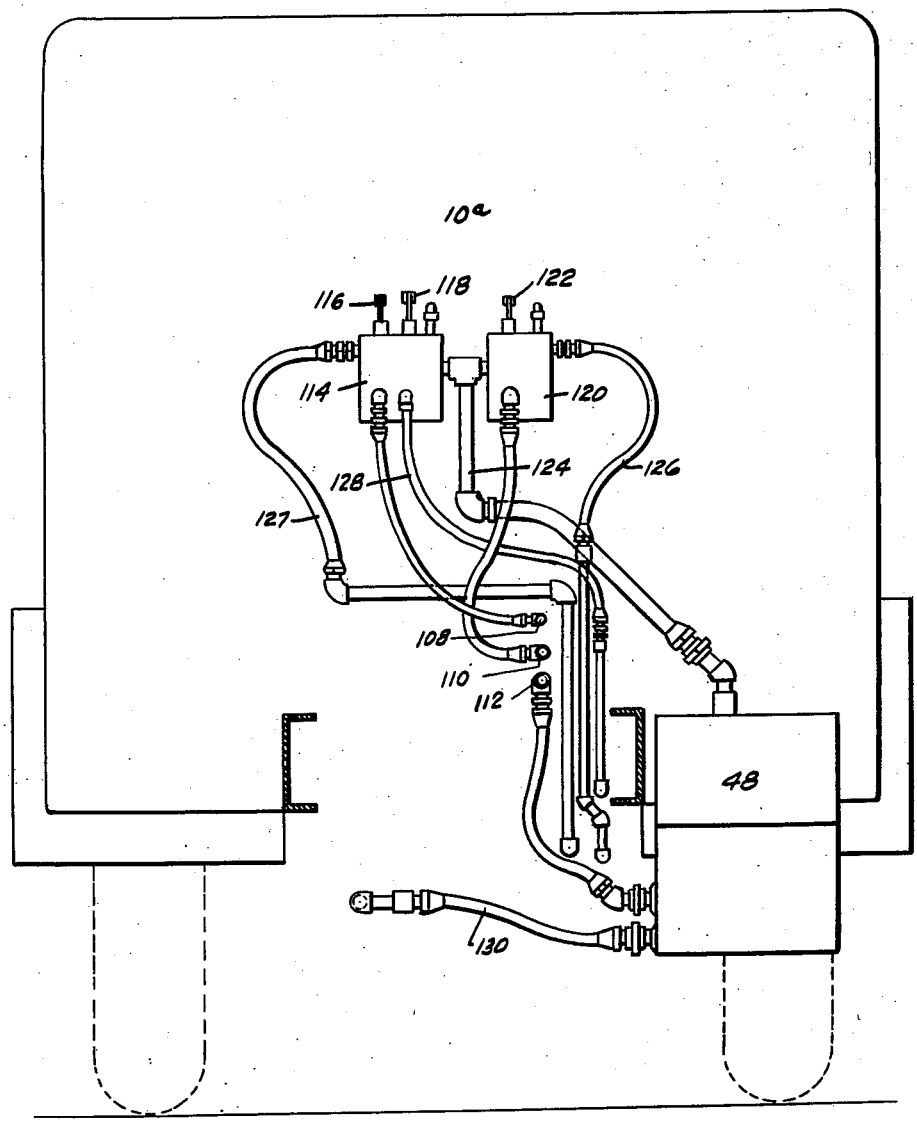
Fig. 5 is a cross-sectional view taken generally on line 5—5 of Fig. 1, showing the location of the hydraulic motor control valves and the oil reservoir.
Figure 6:
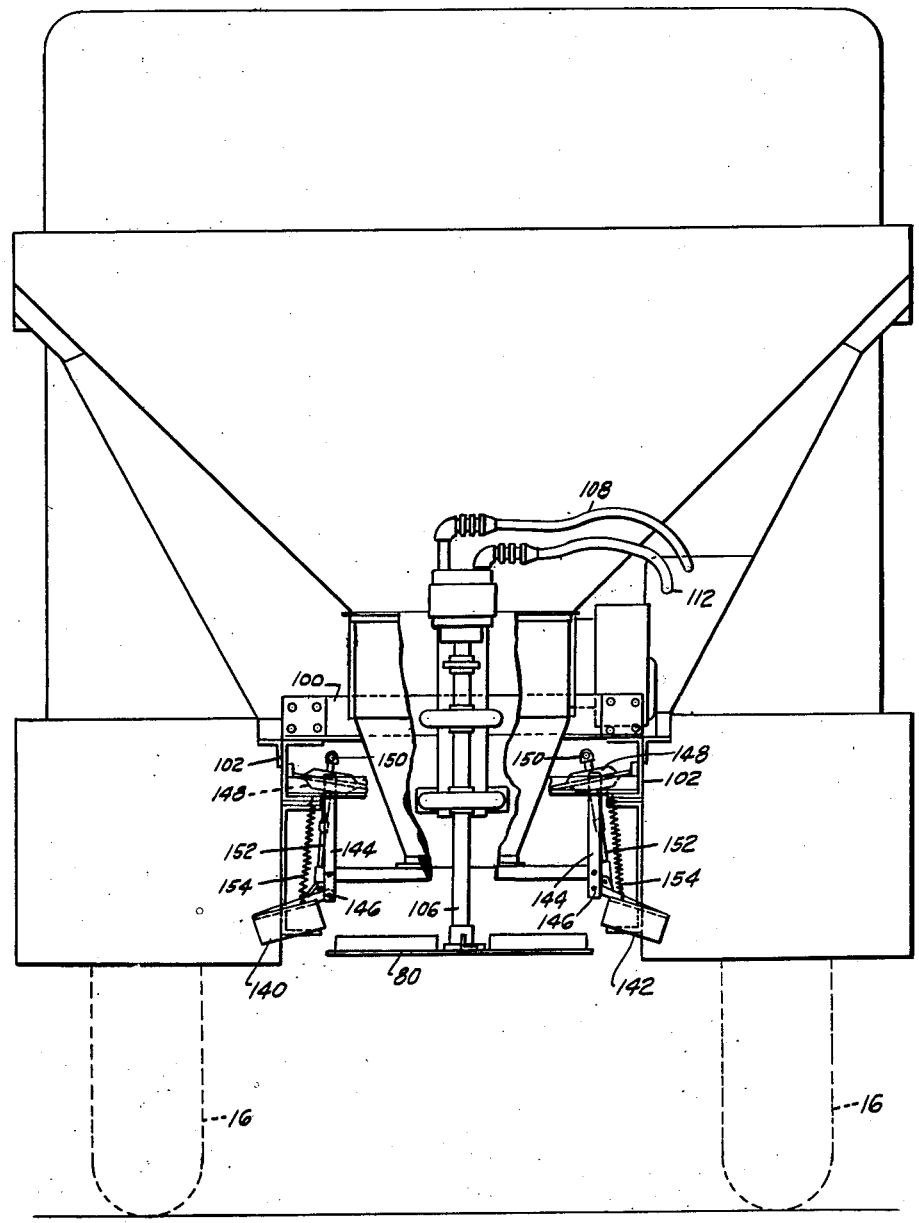
Fig. 6 is a back view of the truck, the material body, the hopper and rotatable disc, with the hopper broken in section to more clearly show the rotatable disc motor drive and supports therefor.

In the embodiment of the invention which I have chosen to illustrate, I have shown the usual truck which may include a cab 10, a body 12 and front and back wheels 14 and 16. The power plant for the truck is preferably either a diesel or an internal combustion motor 18 mounted at the forward end of the cab, the cab and body being generally mounted upon the truck frame 20 in the usual manner.

The motor 18 may be connected by a drive shaft 22 with a pair of tandem hydraulic pumps 24 and 26 mounted at the forward end of the vehicle, the pump 26 being connected by a conduit 28 to a cylinder 30 for raising or lowering snow-plow mechanism associated with the forward end of a plunger 32 in the cylinder 30. The pump mechanism, as best shown in Fig. 2, is all supported upon a base plate 34 mounted upon angle members 36 at the forward end of the channel members 38 of the truck frame 20.

The body 12 which is mounted upon the truck may be of the usual type having an open top, converging side walls 40 and 42, a front wall 44 and a back wall 46. An oil tank or reservoir 48 may be mounted upon the truck frame 20 adjacent the back of the cab 10.

The body 12 may have an endless conveyor 50 mounted adjacent the bottom wall 51 of the same, the conveyor comprising a pair of chains 52 and 54 trained about idler sprockets 56 at the forward end of the body and driving sprockets 58 at the back end of the body, the two sets of chains being connected by spaced slats 60 which in operation move towards the back end of the truck body over the floor of the same.

The back wall 46 of the truck body has an opening 62 to permit the egress of material in the body, the opening being normally closed by a door member 64 hingedly mounted on the back wall 46 of the body.

Coiled compression springs 66 have an end 68 normally tending to urge the door against the wall of the body. However, when a hard lump of material of unusual size is carried forward, the door may be forced open against the spring tension to permit the lump to pass out through the door, and after it has passed the door will again swing forward against the back wall of the truck body. The door is provided with an opening 70 which is normally closed to a desired distance by a vertically slidable panel 72, the same having an arm 74 extending upwardly therefrom. The arm 74 has an elongated slot to receive a bolt fastened in the door 64 and a wing nut on the bolt for manually raising or lowering the panel to permit the desired amount of material to be carried outwardly by the conveyor.

The interior of the truck body may be provided with a generally V-shaped hood or grate 63 extending the length of the same and generally covering the area of the conveyor, the hood being held in position as shown by spaced angle members 65 fastened to the floor of the body.

A generally funnel-shaped hopper 76 is positioned against the back wall 46 of the truck body, the hopper having a reduced discharge opening 78 at its lower end directly above a rotatable disc or spinner member 80. The spinner 80 has a plurality of angularly disposed vertical plate members 82 mounted on the top of the same for throwing material dropped upon the disc outwardly therefrom by centrifugal force.

As previously pointed out, I prefer to employ a hydraulic system for furnishing the motive power for both the conveyor mechanism in the truck body and the rotatable disc or spinner member. Accordingly I have provided the hydraulic motors 90 and 92 for driving the conveyor and the spinner. The motor 90 may be mounted upon a suitable base plate 94 carried adjacent the rear end of the truck body 12, the motor driving the sprocket shaft 96 through a reduced gearing 98 also suitably mounted adjacent the rear of the truck. The motor 92 may be supported upon a vertical bracket 99 that is fastened to a cross-bracket 100 which is connected to the top of channel members 102 forming part of the truck frame. The support bracket 99 may also have a pair of bearings 104 connected thereto to support the drive shaft 106 extending from the motor 92 to the rotatable disc 80.

The hydraulic system through which oil is pumped through the motors 90 and 92 to operate the same, may include the inlet conduit 108 which extends to the motor 92, the conduit 110 which extends to the motor 90, and a return conduit 112 from both motors leading to the oil reservoir 48.

The conduit 108 is connected to the dual control valve 114 and the conduit 110 is connected to the single control valve 120. The control valve 114 is provided with operating levers 116 and 118 which extend forward through the back of the cab into the interior of the same for easy access by the operator. Both control valves are mounted on the back 10a of the cab. The control valve 120 has a conduit 126 extending forward to the pump 24 and the control valve 114 also has a conduit 127 which extends forward to the pump 24 and a conduit 128 which connects with the pump 26. Both control valves 114 and 120 are connected by the conduit 124 as a return with the oil reservoir 48. The conduit 130 from the lower end of the oil reservoir 48 connects with the inlet side of the pump 24.

From the foregoing it can be seen that I have provided a hydraulic system which includes a pump, an oil reservoir, control valves and feed and return conduits from both of the hydraulic motors which are driven by means of the pump 24. By the use of the circulating system shown, either the conveyor motor or the spinner motor may be driven separately or they both may be driven at the same time.

In order to control the width of the space over which sand or other material is to be spread, I have provided a pair of deflector plates 140 and 142 supported at the back of the truck adjacent the rotatable disc 80. The deflector plates may be carried at the lower end of a pair of support members 144 and be pivotally mounted upon rod members 146 at the lower end of the same. Means for operating the deflector plates to raise or lower the same about their pivots may include a pair of air motors 148 preferably connected by means of conduits 150 with the air brake system of the automotive vehicle. This system may be of the usual type used on vehicles which includes an air reservoir A with conduits 153 and 155 leading to front and back air brakes 157 and 159 on the front and back wheels 14 and 16. Conduits 161 also lead from the reservoir to the conduits 150 connected to the air motors 148.

A separate control lever (not shown) may be provided in the cab of the truck for controlling each one of the deflector plates separately. The air motors are connected as shown by means of a pivoted rod 152 with the deflector plates. Spring means 154 normally return or raise the deflector plates when the air pressure is released.

I also provide a bumper in the form of a channel member 170 positioned beyond the back end of the hopper and disc 80 to protect the same from damage.

From the above and foregoing description it can be seen that I have provided a mobile sand spreader which may be manually controlled but is entirely automatic in its operation when in use. By using hydraulic motors for driving both the conveyor for moving the sand to the hopper and also for rotating the spinner, a simple, yet highly efficient drive for the same is provided. By utilizing the power of the power plant of the truck, no further mechanism is necessary to provide an efficient drive for the moving parts of the sand spreader. By the use of the deflector plates 140 and 142 it is possible to control the width of the area upon which sand, salt or other material is to be spread. In addition, when it is desired to spread only to the left or to the right of the truck, this is easily accomplished by lowering either one or the other of the deflector plates.

While I have illustrated and described a specific embodiment of the invention, it will be apparent to those skilled in the art that changes and modifications may be made in the details shown, and I do not wish to be limited in any particular; rather what I desire to secure and protect by Letters Patent of the United States is:

I claim:

In combination, a wheeled truck having a load-carrying body, an air brake system for the wheels of said truck, a cab at the forward end of said body, a truck driving motor located below and forward of said cab, a shaft extending forward from said motor, a hydraulic pump driven thereby, a horizontally disposed endless conveyor mounted on the floor of said load-carrying body, the rear end wall of said body having an opening through which said conveyor extends, a vertically disposed hopper mounted adjacent said rear end wall, a vertically disposed hydraulic motor mounted above said hopper, a shaft extending downwardly therefrom through said hopper, a horizontally disposed disc connected below said hopper to the end of said shaft, a horizontally disposed hydraulic motor positioned adjacent said rear end wall, a shaft extending therefrom, sprockets on said shaft, said endless conveyor trained about said sprockets, an oil tank adjacent said cab, and conduits from said hydraulic pump to both of said hydraulic motors, conduits from said motors to said oil tank, and a single conduit from said oil tank to said hydraulic pump, a pair of deflector plates pivotally mounted on said truck body adjacent said horizontally disposed disc, spring means normally holding the same in raised position and a pair of air motors connected to said air brake system, one air motor secured to one of said pair of deflector plates and the second air motor secured to the other of said pair of deflector plates for tilting either of said deflector plates when desired.

References Cited in the file of this patent

UNITED STATES PATENTS

| | | |
|---|---|---|
| 1,040,888 | Comrie | Oct. 8, 1912 |
| 2,293,977 | Hoffstetter | Aug. 25, 1942 |
| 2,303,876 | Gaddis | Dec. 1, 1942 |
| 2,319,865 | James | May 25, 1943 |
| 2,487,552 | Humphrey | Nov. 8, 1949 |
| 2,517,151 | Weston | Aug. 1, 1950 |
| 2,578,497 | Ballew | Dec. 11, 1951 |
| 2,697,609 | Chase et al. | Dec. 21, 1954 |